United States Patent [19]
Tanner

[11] Patent Number: 5,743,625
[45] Date of Patent: Apr. 28, 1998

[54] CURVED HOUSING ASSEMBLY FOR ILLUMINATED GLASS TUBING AND METHOD

[75] Inventor: Walter Keisler Tanner, Chesnee, S.C.

[73] Assignee: Fallon Luminous Products, Inc., Spartanburg, S.C.

[21] Appl. No.: 790,199

[22] Filed: Jan. 30, 1997

Related U.S. Application Data

[63] Continuation-in-part of Ser. No. 599,644, Feb. 12, 1996, which is a continuation-in-part of Ser. No. 389,314, Feb. 16, 1995, Pat. No. 5,541,823.

[51] Int. Cl.$^6$ ................................. F21S 5/00; F21S 3/00
[52] U.S. Cl. ........................ 362/216; 362/218; 362/219; 362/221; 362/222; 362/223; 362/224
[58] Field of Search ........................ 362/219, 217, 362/218, 222, 223, 224, 225, 260, 263, 264, 267, 373, 375, 216

[56] References Cited

U.S. PATENT DOCUMENTS

| | | |
|---|---|---|
| 2,082,523 | 6/1937 | Segal . |
| 2,269,182 | 1/1942 | Claspy et al. ............... 362/375 |
| 4,161,769 | 7/1979 | Elliott ........................ 362/146 |
| 4,201,004 | 5/1980 | Witt . |
| 4,420,798 | 12/1983 | Herst et al. ................. 362/147 |
| 4,712,165 | 12/1987 | Cetrone ...................... 362/147 |
| 4,858,088 | 8/1989 | Agabekov ................... 362/249 |
| 5,020,252 | 6/1991 | De Boef ..................... 40/564 |
| 5,025,355 | 6/1991 | Harwood .................... 362/223 |
| 5,113,328 | 5/1992 | Foster et al. ............... 362/223 |
| 5,124,896 | 6/1992 | Bentley ...................... 362/223 |
| 5,150,961 | 9/1992 | Gonzalez . |
| 5,192,125 | 3/1993 | Gonzalez . |
| 5,197,797 | 3/1993 | Jaksich ...................... 362/219 |
| 5,255,166 | 10/1993 | Gonzalez . |

FOREIGN PATENT DOCUMENTS

| | | |
|---|---|---|
| 291891 | 7/1965 | Netherlands . |
| 477650 | 10/1969 | Switzerland . |

OTHER PUBLICATIONS

A two page advertisement, "The Next Century's Colorization of Light System":, United States Neon Corporation, Los Angeles, CA 90255.

*Primary Examiner*—Ira S. Lazarus
*Assistant Examiner*—Ljiljana V. Ciric
*Attorney, Agent, or Firm*—Hardaway Law Firm P.A.

[57] ABSTRACT

A longitudinally curved, modular housing assembly for the protective support of illuminated glass tubing, such as neon lights, characterized by interconnected base, central, and cover sections which are all curved and have equal radii of curvature. The configuration of the housing assembly is such that it permits combination thereof with other, similar, housing assemblies to provide continuous lighting systems having various shapes and outlines. The housing assembly preferably contains a transformer and wiring for connection to a power source.

23 Claims, 9 Drawing Sheets

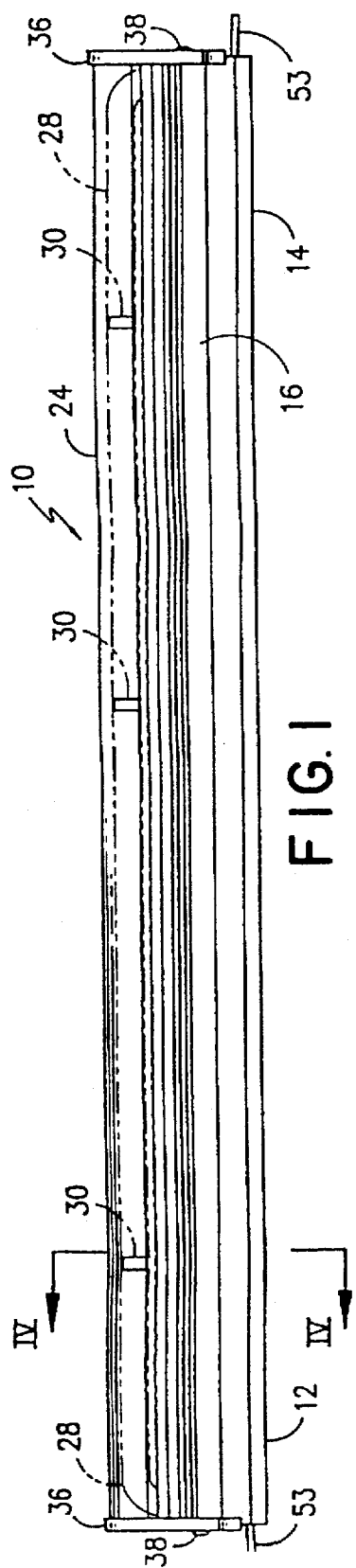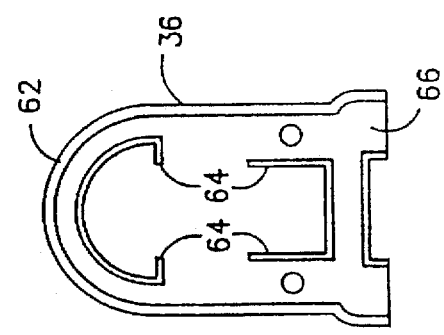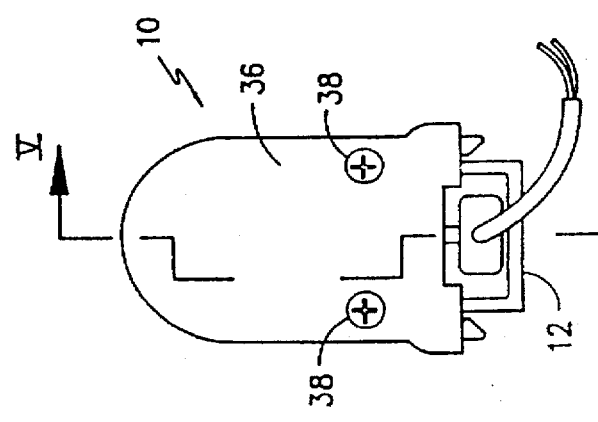

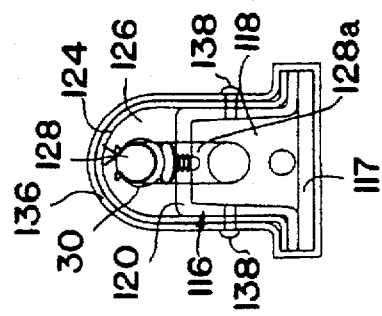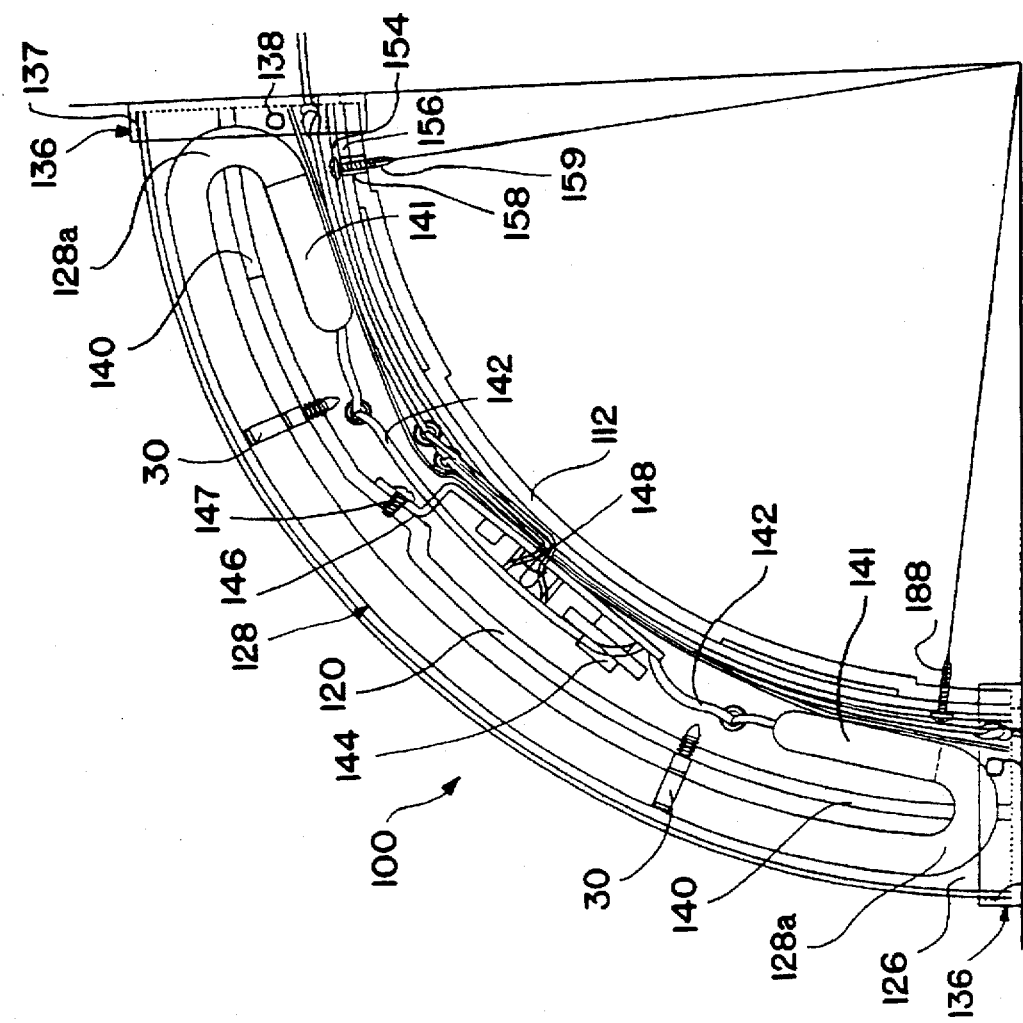

CURVED HOUSING ASSEMBLY FOR ILLUMINATED GLASS TUBING AND METHOD

RELATED APPLICATIONS

This application is a continuation-in-part of allowed U.S. patent application Ser. No. 08/599,644, filed Feb. 12, 1996, which is a continuation-in-part of Ser. No. 08/389,314, filed Feb. 16, 1995 now U.S. Pat. No. 5,541,823.

BACKGROUND OF THE INVENTION

Luminous electric lighting of the inert gas-filled tube type, i.e., neon lights, have long been employed in commercial and business establishments to provide decoration and illumination. Typically, neon lighting has been used in indoor and outdoor environments to outline and highlight various structures, such as buildings, amusement rides, display signs, ceiling moldings, counter edges, and the like.

Traditionally, when neon lights are used to outline objects of complex shapes, such as when outlining the ceiling area where two walls meet at a 90° angle, this has created difficulties. This is because the neon bulb for such an application will come preformed to the needed shape, i.e., two long straight legs and a 90° turn. This results in the neon bulb becoming unwieldy to handle and install other than by experienced persons. With the increase in the use of neon lighting in complex outlining arrangements, this has become unacceptable.

Thus, when it comes to easily producing neon lights of complex shapes, etc., there is room for improvement within the art.

OBJECTS OF THE INVENTION

It is an object of the invention to provide a modular housing assembly product for illuminated glass tubing that allows low skilled workers to construct complexly shaped neon lights.

It is a further object to provide a modular housing assembly product for illuminated glass tubing which easily allows the purchaser to neon lights having complex shapes, outlining, and highlighting.

It is yet a further object to provide a modular housing assembly product in which virtually any pattern of outlining can be created merely by mixing and matching different housing assemblies.

It is still yet a further object to provide a unitized modular continuous lighting system with multiple housing assemblies which may be used in various lengths and combinations.

It is still another object to provide a housing assembly for protective support of illuminated glass tubing wherein multiple assemblies may be used in combinations without high-voltage wiring exposed therebetween.

It is still another object to provide a housing assembly for protective support of illuminated glass tubing wherein multiple housing assemblies may be employed in series and interconnected with all wiring therebetween contained within the assemblies and protected from weather conditions.

It is still another further object to provide a housing assembly for protective support of illuminated glass tubing wherein the assemblies may be easily and simply installed on a supporting surface by workmen requiring no specialized training.

These and other objects of the invention are achieved by:

BRIEF DESCRIPTION OF THE DRAWINGS

FIG. 1 is a side elevation view of a housing assembly for protective support of illuminated glass tubing according to the present invention;

FIG. 2 is an enlarged right end view of the housing assembly of FIG. 1 showing the outside surface of an end cap of the assembly;

FIG. 3 is an elevation view of the inside surface of an end cap of the housing assembly;

FIG. 10 is a sectional elevation view of a curved housing assembly according to the invention.

FIG. 11 is an end view of a curved housing assembly according to the invention.

DETAILED DESCRIPTION OF THE DRAWINGS

Figure 4:
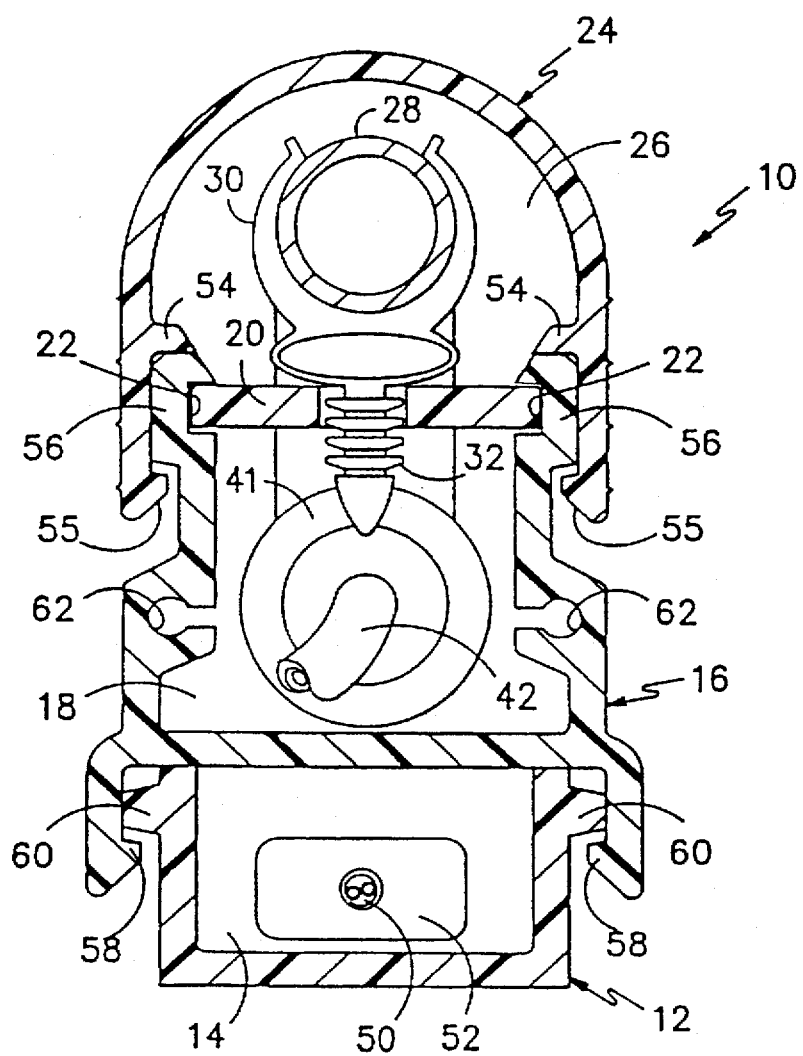
FIG. 4 is an enlarged cross-sectional view of the housing assembly of FIG. 1, with left-hand end cap removed, taken generally along line IV—IV of FIG. 1, and looking in the direction of the arrows.

Referring more particularly to the drawings, and especially FIGS. 1–9, a straight version of the housing assembly 10 according to the invention will be described. Together with the curved housing assembly 100 described with reference to FIGS. 10–14, they create a modular lighting system that meets and achieves the various objects of the invention set forth above.

The housing assembly 10 for protective support of illuminated glass tubing of the present invention includes a mounting base section 12 having wall portions forming an open-sided elongated channel 14, a central section 16 having wall portions forming an open-sided elongated channel 18, an elongated flat support plate 20 slidably received and supported in opposed elongated grooves 22 located adjacent the open side of central section channel 18, and a cover section 24 having a wall of generally semi-circular shape forming an open-sided elongated channel 26. (Note particularly FIG. 4.)

The components of the housing assembly 10 preferably are formed of a suitable resiliently deformable material, such as plastic, which are molded into the configurations shown. For economical and simple fabrication, the mounting base section 12, central section 16, and cover section 24 each are of constant cross-sectional shape along their lengths, enabling the formation of the sections in a conventional extrusion molding operation. (See FIG. 4). The plastic material employed for the housing conveniently may be LEXAN©. The housing assembly sections may be extruded in varying lengths, as desired, and end caps 36 of rigid plastic are secured to the ends of the housing by screws 38 to close the channels of the central and cover sections, and to protect components therein from elements of weather or other contamination.

The mounting base section 12, central section 16, support plate 20, and end caps 36 are generally opaque, while the cover section 24 is formed transparent or translucent for transmission of light from the illuminated glass tubing 28 from the housing assembly.

Located inside the cover section 24 is elongated glass tubing 28 of the neon-tube type. The tubing 28 is supported in the housing by means of a plurality of tube-engaging clips 30 of resiliently deformable material which are attached to support plate 20 by means of a deformable threaded projection 32 which is fictionally received in and extends through openings 34 in the support plate.

Figure 5:
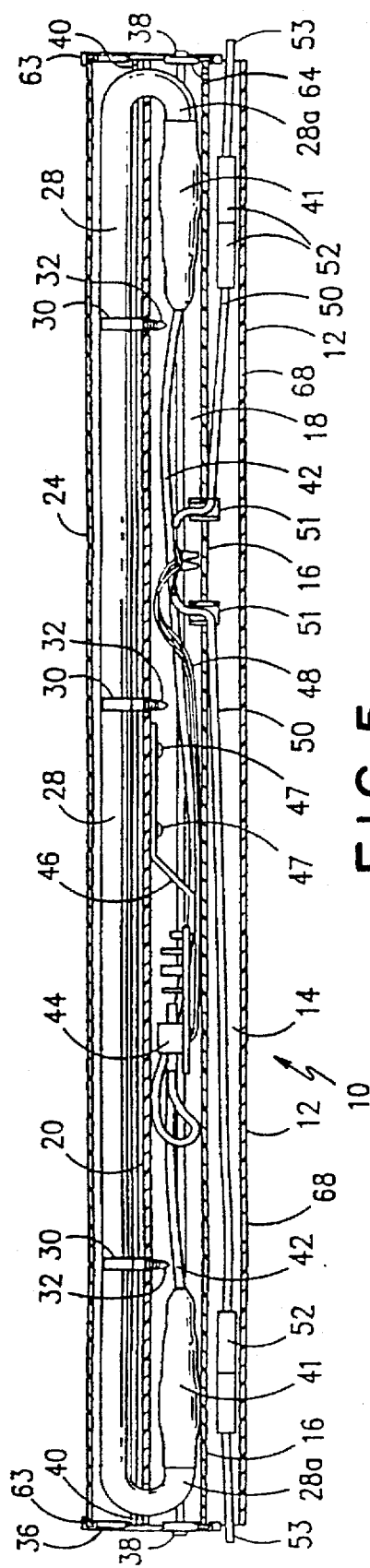
FIG. 5 is a sectional elevation view of the housing assembly taken generally along the indicated lines V—V of FIG. 2, and looking in the direction of the arrows thereof.

As best seen in FIGS. 4 and 5, the length of glass tubing 28 is supported in snap-fit relation in each of the clips 30 and end portions 28a of the tubing are bent, as in a glass heating operation, to extend downwardly from the cover section channel through openings 40 in support plate 20 into the channel 18 of the central section 16 (FIGS. 4 and 5). The ends of the glass tubing are electrically connected, as by electrodes 41, through transformer output wiring 42 to transformer means 44 which is attached by means of a mounting bracket 46 with fastening screws 47 to the underside of support plate 20 (FIG. 5). The transformer means 44 is in turn connected by means of wiring 48 to a length of jumper wiring 50 located in the mounting base section channel of the housing. One end of the jumper wiring sections 50 extends through small openings in the lower wall of the central section for connection to the wiring 48 and the ends are frictionally secured therein by wire strain relief elements 51. The other ends of the jumper wiring are provided with electrical connection sockets 52 to be attached by additional short lengths of jumper wiring 53 to a power supply and/or jumper wiring in next adjacent housing assemblies of a lighting array.

Figure 7:
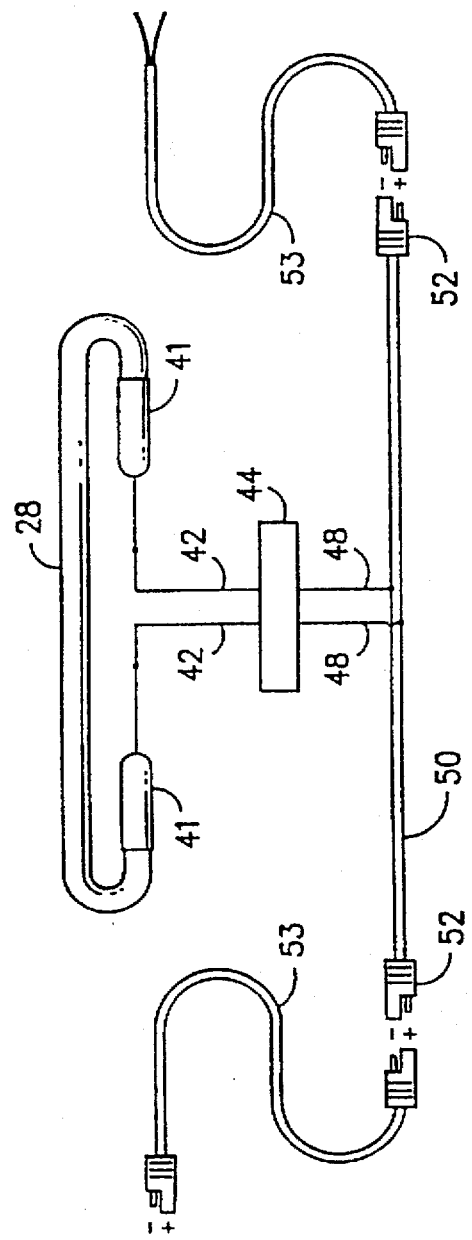
FIG. 7 is a wiring diagram of the illuminated glass tubing of the housing assembly, showing schematically the electrical connections and components supplying low voltage power to the illuminated tubing of housing assembly.

FIG. 7 shows schematically the interconnection of the electrical components of the housing assembly 10 to supply power to the illuminated tubing therein. As illustrated, power may be supplied from a suitable power source such as a low voltage DC power supply (not shown) by way of jumper wiring sections 53, 50 and wiring 48 to conventional transformer means 44 of a type suitable to convert the low voltage DC power source to the high voltage power sufficient to electrify and illuminate the inert gas or gases in the tubing 28. Power is supplied to the gas-filled tubing 28 by way of transformer output wiring 42 and electrodes 41 connected to the ends of the tubing.

Figure 6:
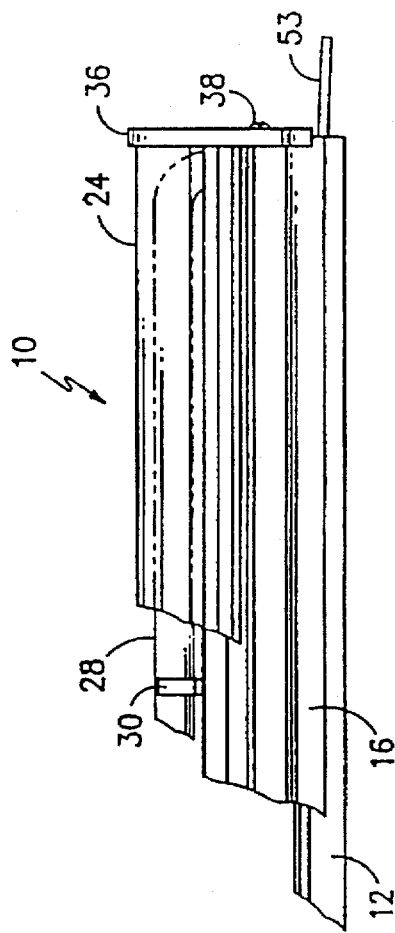
FIG. 6 is an enlarged, broken-away side elevation view of the right-side end portion of the housing of FIG. 1.

Component sections 12, 16 and 24 of the housing assembly are easily assembled and interconnected by frictional engagement of the sections with each other. As best seen in FIGS. 4 and 6, lower side wall portions of cover section 24 of the housing assembly 10 project downwardly and have an upper shoulder 54 and lower protrusion 55 which receive and engage an elongated outer shoulder 56 on the upper wall edges of the central section 16 in snap-fit, frictional relation, such that the open sides of the channels of the cover section 24 and central section 16 are closed from weather contamination. The channels of the cover section communicate through the openings 40 (FIG. 5) in the ends of support plate 20 through which the tubing 28 passes.

In a similar manner, lower wall portions of central section 16 of the assembly project downwardly and have inward protrusions 58 which receive elongated shoulders 60 on the outer upper wall of mounting base section 12 in snap-fit, frictional engagement to close the open side of the mounting base channel 14. Located in opposed relation on the inner surface of the wall portions of the central section 16 of the housing assembly are passageways, the open ends 62 (FIG. 4) of which receive the threaded screws 38 to secure the end caps of the housing assembly to the ends of the housing sections and seal the ends of the cover section channel and the central channel of the assembly from the weather and contamination.

As best seen in FIG. 3, the inside surface of each of the end caps 36 of the housing assembly has peripheral and internal protruding ribs, as at 63 and 64, which engage the ends of sections 12, 16, and 24 to provide positional support and strength to the cover, central and base support sections of the assembly when the end caps are attached thereto. To further seal the channels of the cover and central sections of the assembly, the inner surface of the end cap may be provided with insulation material, such as foam rubber pad 66.

Figure 8:
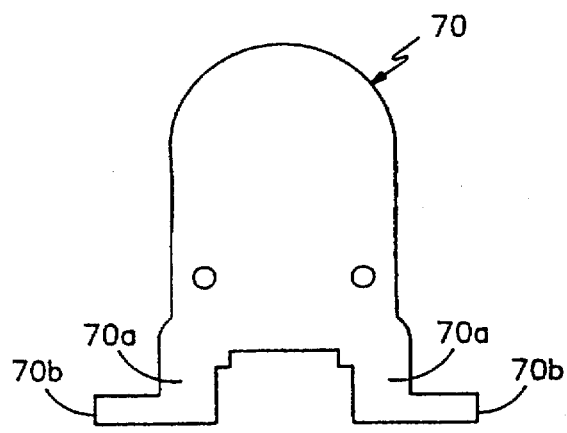
FIG. 8 is an enlarged elevation view of the outside face of a modified form of end cap for the housing assembly of FIG. 1.
Figure 9:
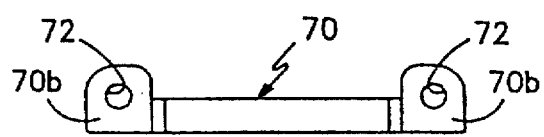
FIG. 9 is a top plan view of the modified end cap seen in FIG. 8.

As best seen in FIGS. 8 and 9, which depict a modified form of end cap 70 for the housing assembly, the housing assembly may be attached to a suitable support surface by means of the end caps 70 alone. As seen, the lower sides 70a of the end caps extend further down to terminate in the same plane as the lower wall of the mounting base section 12 and are provided with protruding shoulder portions 70b having openings 72 therethrough to receive suitable fastening means, such as screws or nails, to attach the end caps directly to a support surface for support of the housing assembly.

From the foregoing description of preferred embodiments of the invention, it can be seen that the housing assembly may be easily supportably attached to and assembled on a supporting surface for use. Utilizing the assembly and end cap construction shown in FIGS. 1, 2, 3, 5, and 6, base support section 12 of the assembly first may be mounted on a receiving support surface by suitable fastening means, such as screws or nails, located in spaced openings 68 (FIG. 5) of the base section. Thereafter, the cover and central sections 24, 16 of the assembly with tubing and wiring may be attached in snap-fit frictional engagement with each other and to the previously mounted base support section 12, with the jumper wiring 50 and 52 supplying low voltage DC power to the transformer and tubing positioned in the channel of the base support section 12. If it is desired to attach the assembly to a support surface by using the modified form of end caps 70, as shown in FIGS. 8 and 9, the base, central, and cover sections and end caps 70 may be pre-assembled before mounting on a support surface, with all circuit and power supply wiring contained and hidden within the assembly housing. Thereafter, one or more housing assemblies is attached to a receiving surface by securing the end caps 70 thereto. End portions of the jumper wiring 50 are attached by either of jumper wiring sections 53 to a power supply line or to the next adjacent jumper wiring in an array of housing assemblies placed in end-to-end relation to establish illumination for a desired distance.

End caps of the housing assembly attached to the ends of the housing effectively seal the cover and central sections of the assembly, while the interconnecting short jumper wiring sections 53 between adjacent assemblies may be pushed into and located within the ends of the base plate channel 12, thus minimizing exposed lengths of wiring between interconnected housing assemblies of an array. By providing a high-voltage step-up transformer 44 in each housing assembly, power may be supplied to an array of assemblies from a single low voltage power source, e.g., 12 volt DC, thereby eliminating high-voltage wiring exposure between assemblies.

If it is desired to program individual housing assemblies of the lighting array in an off-on blinking pattern, power and control circuit wiring from a remote control device may be run in parallel through one or more base plate channel sections of the contiguous assemblies to supply power alternately to individual one or more of the housing assemblies in the array, with power supply lines being contained within and protected by the housing assemblies, thereby substantially eliminating exposed wiring in the array.

The construction arrangement of the component parts of the housing assemblies and their manner of interconnection permit ready disassembly and repair of a housing assembly array in field locations with ready removal and replacement of tubes and transformers of the individual assemblies by workmen needing no specialized or skilled training.

Having described the structure, operation, and use of straight housing assemblies 10, a description of curved housing assemblies 100 according to the instant invention, and which meet and achieve the various objects of the invention set forth above, will be now made with reference to FIGS. 10–14. Generally, components that serve a similar or identical function in housing assembly 100 as they did in housing assembly 10 of FIGS. 1–9 have merely had 100 added to their respective reference numerals.

Curved housing assembly 100 for protective support of curved illuminated glass tubing of the present invention includes: curved and flat mounting base section 112; curved inverted u-shaped central section 116 having downwardly directed wall portions forming an open-ended elongated channel 118 and an elongated flat support surface 120; and curved inverted u-shaped transparent cover section 124 that provides for a 180° presentation of the glass tubing 128 contained therein and having a wall of generally semicircular shape forming an open-ended elongated channel 126. In end view, both housing assembly 10 and housing assembly 100 have the same cross-sectional dimensions.

Inside transparent cover section 124 is elongated glass tubing 128 of the neon-tube type. Tubing 128 is attached to support surface 120 by use of the same clips 30 described above. Curved housing assemblies 100 will be produced in both "outer" and "inner" configurations. By "inner" and "outer", reference is made to the position of glass tubing 128 with respect to the curvature. An inner unit has glass tubing 128 on the inside of the curve (FIG. 13A), e.g., useful for concave corners, and an outside unit has glass tubing 128 on the outside of the curve (FIG. 13B), e.g., useful for convex corners.

The various components of the curved housing assembly 100 preferably are made from vacuum formable materials, such as thermoplastics, which are formed into the configurations shown. Extrusion molding, the method used to produce straight housing assemblies 10, cannot be used to produce the curved components of this embodiment. For economical and simple fabrication, base section 112, central section 116, and cover section 124 each are of constant cross-sectional shape along their lengths. The plastic material employed for curved housing assembly 100 conveniently may be thermoplastic for forming curves. The housing assembly sections may be formed in varying degrees of curvature and size, as desired. While curved housing assembly 100 ordinarily have 90° of arc (curvature), any amount of arc can be used. End caps 136 of clear rigid plastic are secured to the ends of housing assembly 100 by screws 138 to close the channels of the central and cover sections, and to protect components therein from elements of weather or other contamination.

Base section 112 and central section 116 with its support surface 120 are generally opaque. Cover section 124 and end caps 136 are formed transparent or translucent for transmission of light from curved illuminated glass tubing 128.

Figure 12:
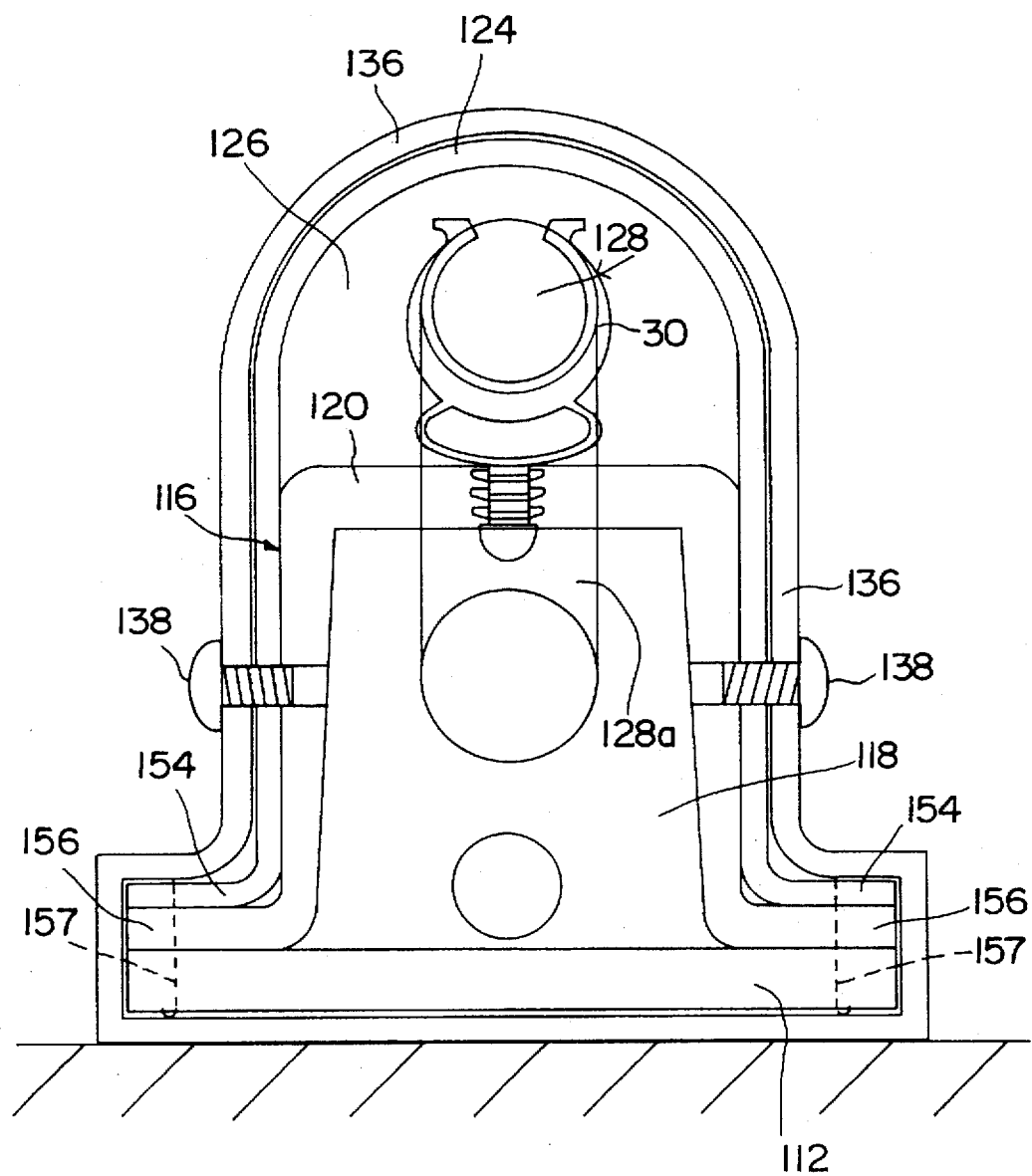
FIG. 12 is an enlarged end view of a curved housing assembly according to the invention.
Figure 13A:
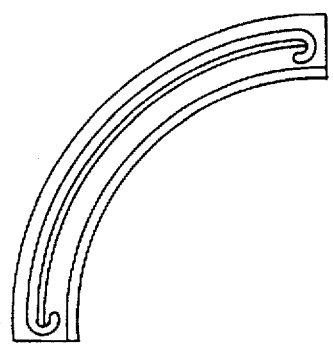
FIGS. 13A and 13B are simplified plan views of curved housing assemblies according to the invention in which the glass tubings are on the outside and inside of the arcs, respectively.
Figure 13B:
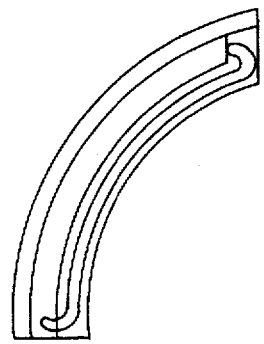

As best seen in FIGS. 11 and 12, curved glass tubing 128 is supported in snap-fit relation in each of clips 30 and end portions 128a of tubing 128 are bent, as in a glass heating operation, to extend downwardly from cover section channel 126 through openings 140 in support plate 120 into channel 118 of central section 116 (FIGS. 10–12). The ends of glass tubing 128 are electrically connected, as similarly shown in FIGS. 7 and 9, by electrodes 141, through transformer output wiring 142 to transformer 144 which is attached by mounting bracket 146 with fastener 147, such as a screw 147, to the underside of support plate 120 (FIG. 10). Transformer 144 is in turn connected by wiring 148 to a length of jumper wiring 150 located in channel 118 of central section 116. One end of the jumper wiring sections 150 extends through small openings in the lower wall of the central section for connection to the wiring 148 and the ends are frictionally secured therein by wire strain relief elements 151. The other ends of the jumper wiring are provided with electrical connection sockets identical to those shown in FIG. 7 to be attached by additional short lengths of jumper wiring to a power supply and/or jumper wiring in next adjacent housing assemblies of a lighting array, as described with respect to FIG. 7, which is equally applicable to housing assemblies 100.

Component sections 112,116 and 124 of curved housing assembly 100 are easily assembled and affixed to each other by use of fasteners, such as staples 157. As best seen in FIG. 12, lower side wall portions of cover section 124 project downwardly and receive support surface 120 of central section 116 therein and shoulders 154 of cover section 124 contact elongated shoulders 156 of central section 116. Base section 112 is then placed in contact with shoulders 156 and the three overlapping components 112, 116, 124 fastened together, such as by staples 157. Thus, the electrical components are protected in channel 118 of central section 116 by base 112 and end caps 136. Furthermore, mounting holes 158 can be made through the three overlapping components for mounting the curved housing assembly 100 to a support surface by use of additional fastener 159. With curved housing assemblies 100, end caps 136 also hold base 112, central 116, and transparent cover 124 sections together. In this regard, end cap 136 has a shape identical to that of the cross-section of curved housing assembly 100. End cap 136 also has rim 137 along its perimeter identical to the perimeter defined by the cross-section of curved housing assembly 100. Thus, end cap 136 fits over the ends of housing 136 and further holds the three fastened sections 112, 116, 124 together and seals the ends of the cover and central section channels of housing assembly 100 from the weather and contamination. Furthermore, note that as with the end caps 70 described above, it is possible to modify end caps 136 so they may be used to fasten curved housing assembly 100 to a support surface. Finally, to further seal the channels of the cover 124 and central 116 sections of the assembly, the inner surface of end caps 136 may be provided with insulation material, such as foam rubber pad (not shown).

Figure 14A:
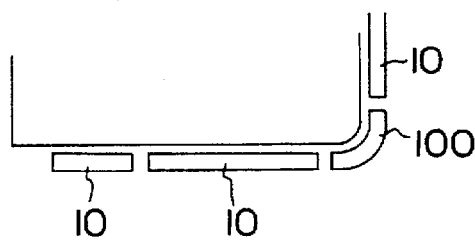
FIGS. 14A, 14B, and 14C, show different neon lighting combinations achievable using the curved housing assemblies according to the invention in combination with straight housing assemblies as claimed in this application's parent.
Figure 14B:
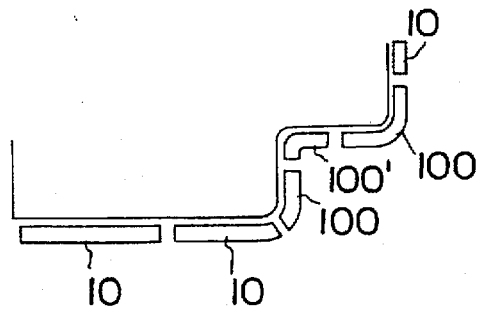
Figure 14C:
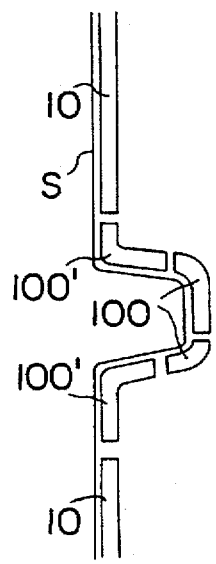

Having described its structure, reference will now be made to applications for curved housing assembly 100. In accordance with the modular nature of the various housing assemblies described herein, neon lighting effects of various configurations can be created. For example, FIG. 14A is a plan view depicting a number of straight housing assemblies 10 used in combination with outer curved housing assembly 100 to outline either a counter or some other structure having a corner. Traditionally such an outline has been provided in one piece that is difficult to handle and install. Because housing assemblies 10 and 100 have the same cross-sectional dimensions as described above, they form an attractive and continuous lighting effect. FIG. 14B is a plan view depicting a number of straight housing assemblies 10 used in combination with a number of inner and outer curved housing assemblies 100 to outline a structure having both convex and concave curvatures. Finally, FIG. 14C is an elevation view depicting a number of straight housing assemblies 10 used in combination with a number of inner and outer curved housing assemblies 100 to create a multi-dimensional neon lighting effect. Typically, multi-dimensional signs and lights have been complex to make because the glass tubing is long, delicate, and formed in the desired complex shape of the sign and/or light. Therefore, the sign and/or light must be installed extremely carefully and only by trained personnel. However, with the instant modular system, an installer of practically any skill level can safely mix, match, and mount any number or combination of curved 100 and straight 10 modules to produce a sign or outline of virtually any configuration.

The above description is given in reference to a curved housing assembly for illuminated glass tubing and method. However, it is understood that many variations are apparent to one of ordinary skill in the art from a reading of the above specification and such variations are within the spirit and scope of the instant invention as defined by the following appended claims.

That which is claimed:

1. A curved housing assembly for protective support of curved illuminated glass tubing comprising:

a curved longitudinally base section;

a curved and inverted u-shaped central section having an elongated support section for supporting glass tubing and downwardly directed wall portions forming an elongated channel having an open side adjacent said base section;

a curved and inverted u-shaped light-transmitting cover section having downwardly directed wall portions forming an elongated channel having an open side for receiving said central section therein, with the radii of curvature of said base, central, and cover sections being equal; and fasteners for joining together said base, central, and cover sections.

2. The housing assembly according to claim 1 wherein said three sections of said assembly have substantially parallel longitudinal axes.

3. The housing assembly according to claim 2 including end caps fixed to open ends of said central and cover sections of said assembly to close and seal said open ends of said central and cover sections.

4. The housing assembly according to claim 3, wherein said end caps are made from a clear material.

5. The housing assembly according to claim 3, wherein each said end caps has a rim about its perimeter, said rim passing around ends of said base, central, and cover sections.

6. The housing assembly according to claim 1 including support elements attached to said support section for supportably receiving and positioning curved glass tubing to reside within and extend along the channel of said cover section.

7. The housing assembly according to claim 6 including elongated curved glass tubing supported in said support means and disposed in and extending along said cover section channel, and power-supplying means disposed in said assembly for supplying electricity to said glass tubing.

8. The housing assembly according to claim 7 wherein said power-supplying means includes a transformer and wiring for connecting said transformer to a power source, said electrical means located in said central section of said assembly.

9. The housing assembly according to claim 8 wherein said elongated curved glass tubing supportably positioned in said cover section channel has end portions thereof extending into said central section channel for communication with said electrical wiring and transformer.

10. The housing assembly according to claim 7 wherein said wiring includes electrical connectors disposed in said central section channel adjacent each end thereof for interconnecting, in series, a curved housing assembly to a plurality of other housing assemblies to a power source.

11. The housing assembly according to claim 10 wherein said plurality of other housing assemblies comprise straight linear housing assemblies such that said straight linear and said curved housing assemblies form a light that passes around a corner.

12. The housing assembly according to claim 10 wherein said plurality of other housing assemblies comprise curved housing assemblies such that all said assemblies form a three-dimensional light.

13. The housing assembly according to claim 1 wherein said three sections of the housing are formed by vacuum-forming thermoplastic materials.

14. The housing assembly according to claim 13 wherein each of said three sections have a continuous cross-section.

15. The housing assembly according to claim 1 wherein said fasteners comprise staples.

16. The housing assembly according to claim 1 wherein said cover section provides at least 180° of glass tubing presentation.

17. The housing assembly according to claim 1 wherein said base section includes mounting to facilitate mounting of said base section to a support surface for the housing assembly.

18. The housing assembly according to claim 1 including end caps fixed to open ends of said central and cover sections of said assembly to close and seal said open ends of said central and cover sections, and wherein said end caps include mounting thereon to facilitate mounting of the assembly to a support surface therefor.

19. The housing assembly according to claim 1, wherein the curve of each of said three sections comprises a 90° arc with said glass tubing inside said arc.

20. The housing assembly according to claim 1, wherein the curve of each of said three sections comprises a 90° arc with said glass tubing outside said arc.

21. The housing assembly according to claim 1, wherein said cover section has vents therein.

22. The housing assembly according to claim 1, wherein spaces between said base and central sections form vents.

23. A method of providing a substantially continuous neon light, comprising the steps of:

providing a plurality of straight light housing assemblies, each said housing assembly having all of its electrical components contained therein except for jumper cables for connecting said straight housing assemblies to other housing assemblies or a source of electricity;

providing a plurality of curved light housing assemblies, each said housing assembly having all of its electrical components contained therein except for jumper cables for connecting said straight housing assemblies to other housing assemblies or a source of electricity;

selecting a combination of straight and curved housing assemblies needed to produce a desired neon light configuration;

interconnecting said jumper cables of said selected housing assemblies; and attaching one of said selected and interconnected housing assemblies to a source of electricity.

* * * * *